(12) United States Patent
Tanaka et al.

(10) Patent No.: US 6,332,639 B1
(45) Date of Patent: Dec. 25, 2001

(54) REAR TRUNK FOR A VEHICLE

(75) Inventors: Koichi Tanaka; Toshinori Nakano; Terunari Saiki, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,405

(22) Filed: Dec. 8, 1999

(30) Foreign Application Priority Data

Dec. 8, 1998 (JP) .................................................. 10-366086

(51) Int. Cl.$^7$ .................................................. B60R 9/055
(52) U.S. Cl. .................. 296/37.1; 296/37.6; 224/401; 224/413
(58) Field of Search ................. 296/37.1, 37.6, 296/24.1; 224/413, 401

(56) References Cited

U.S. PATENT DOCUMENTS

| | | | |
|---|---|---|---|
| D. 244,927 | * | 7/1977 | Anthony, III ........................ D12/158 |
| D. 308,191 | * | 5/1990 | Yamada et al. ..................... D12/158 |
| D. 343,815 | * | 2/1994 | Kamata ............................... D12/410 |
| 3,999,693 | * | 12/1976 | Cooper, Sr. ........................ 296/37.1 X |
| 4,690,237 | * | 9/1987 | Funabashi et al. ................ 224/413 X |
| 4,762,197 | * | 8/1988 | Yamada et al. ................... 296/37.6 X |
| 4,938,398 | * | 7/1990 | Hallsen ............................... 296/37.6 X |
| 4,993,610 | * | 2/1991 | Abretske et al. ................. 296/37.6 X |
| 5,573,162 | * | 11/1996 | Spencer et al. ........................ 224/401 |
| 6,016,943 | * | 1/2000 | Johnson et al. ....................... 224/401 |
| 6,139,080 | * | 10/2000 | Staffold ................................. 296/37.6 |

FOREIGN PATENT DOCUMENTS

Y262-45985   12/1987   (JP) .

\* cited by examiner

*Primary Examiner*—Joseph D. Pape
*Assistant Examiner*—Lori L Coletta
(74) *Attorney, Agent, or Firm*—Birch, Stewart, Kolasch & Birch, LLP

(57) ABSTRACT

A rear trunk for a vehicle having a rear wall which is inclined with respect to a bottom portion of the trunk such that it overhangs the bottom of the trunk. The opening of the trunk may be narrower than the bottom of the trunk without requiring complicated manufacturing steps. The body of the trunk can be formed in this shape as an integral piece by blow molding. An inner member can be included which divides the interior space of the trunk body into separate compartments, and may be blow molded integrally with the trunk body.

17 Claims, 6 Drawing Sheets

REAR TRUNK FOR A VEHICLE

BACKGROUND OF THE INVENTION

1. Field of the Invention

The present invention relates to a vehicular rear trunk suitable for a two-wheeled motor vehicle.

2. Background Art

An example of a conventional vehicular rear trunk is disclosed in Japanese Utility Model Publication No. Sho 62-45985. The vehicular rear trunk disclosed in this publication includes a trunk body portion which is disposed behind the seat of a two-wheeled motor vehicle. A lid portion is provided for opening and closing the opening of the trunk body portion, and an electric appliance is accommodated within a rear portion of the interior of the trunk body portion. The vertical, transverse and longitudinal directions used in the present invention are described in reference to a mounted state of the vehicular rear trunk on a vehicle.

Because the trunk body portion is usually formed by injection molding, it is required that its opening be as large as or larger than its bottom side. However, it is sometimes required that the rear trunk have a narrow upper shape, and that a lower side of its rear wall extend rearwardly to form an inclined surface when viewed from the trunk's side. In a conventional injection molding process, it is difficult to obtain such a shape, and the freedom of design for the shape is restricted.

It is possible to obtain such a shape for a trunk body portion in a right-left divided form by molding, but in this case it is necessary to seal and bond the right and left mating portions. This results in a complicated structure, and more time and labor are required for production.

It would therefore be desirable to construct a trunk body portion having a relatively narrow upper portion without excessive cost and difficulty of manufacture.

It would also be desirable to construct a trunk body portion which allows for storage of goods separate from vehicle lighting appliances.

SUMMARY OF THE INVENTION

The present invention is in part addressed to overcoming the shortcomings of the prior art and for achieving other advantages not contemplated by the prior art.

An embodiment of a vehicle trunk according to the present invention includes a trunk body portion in the interior of which is accommodated an electric appliance, such as a light. A lid portion opens and closes the opening of the trunk body portion. The trunk body portion has a shape in which the upper portion of the trunk is narrow, with the opening thereof being narrower than the bottom of the trunk. A rear wall of the trunk body portion extends rearwardly on its lower side to form an inclined surface, and an electric appliance receptacle portion is formed below the inclined surface. The trunk body portion is formed by blow molding.

An inner member may also be provided within the trunk body portion to partition the interior of the trunk body portion into a goods receptacle portion and the electric appliance receptacle portion, the inner member being formed by molding integrally with the trunk body portion.

According to a first aspect of the invention, a trunk body portion having an upper narrower shape with its opening narrower than its bottom, and having a rear wall formed as an inclined surface with an electric appliance receptacle portion formed therebelow, can be obtained as a single body by blow molding. Thus, the degree of freedom of design can be increased with respect to the shape of the trunk body portion. Also, it is not necessary to adopt a right-left divided form for molding, resulting in a relatively simple structure and permitting easy production of the trunk body portion.

According to a second aspect of the invention, because the inner member is formed in one piece with the trunk body portion during molding, it is possible to simplify both the trunk structure and the production process. Moreover, because the interior of the trunk body portion is partitioned into the goods receptacle portion and the electric appliance receptacle portion by the inner member, it is possible to store goods separately from the electric appliance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A rear trunk for use in a two-wheeled motor vehicle according to an embodiment of the present invention will be described below with reference to the drawings.

Figure 1:
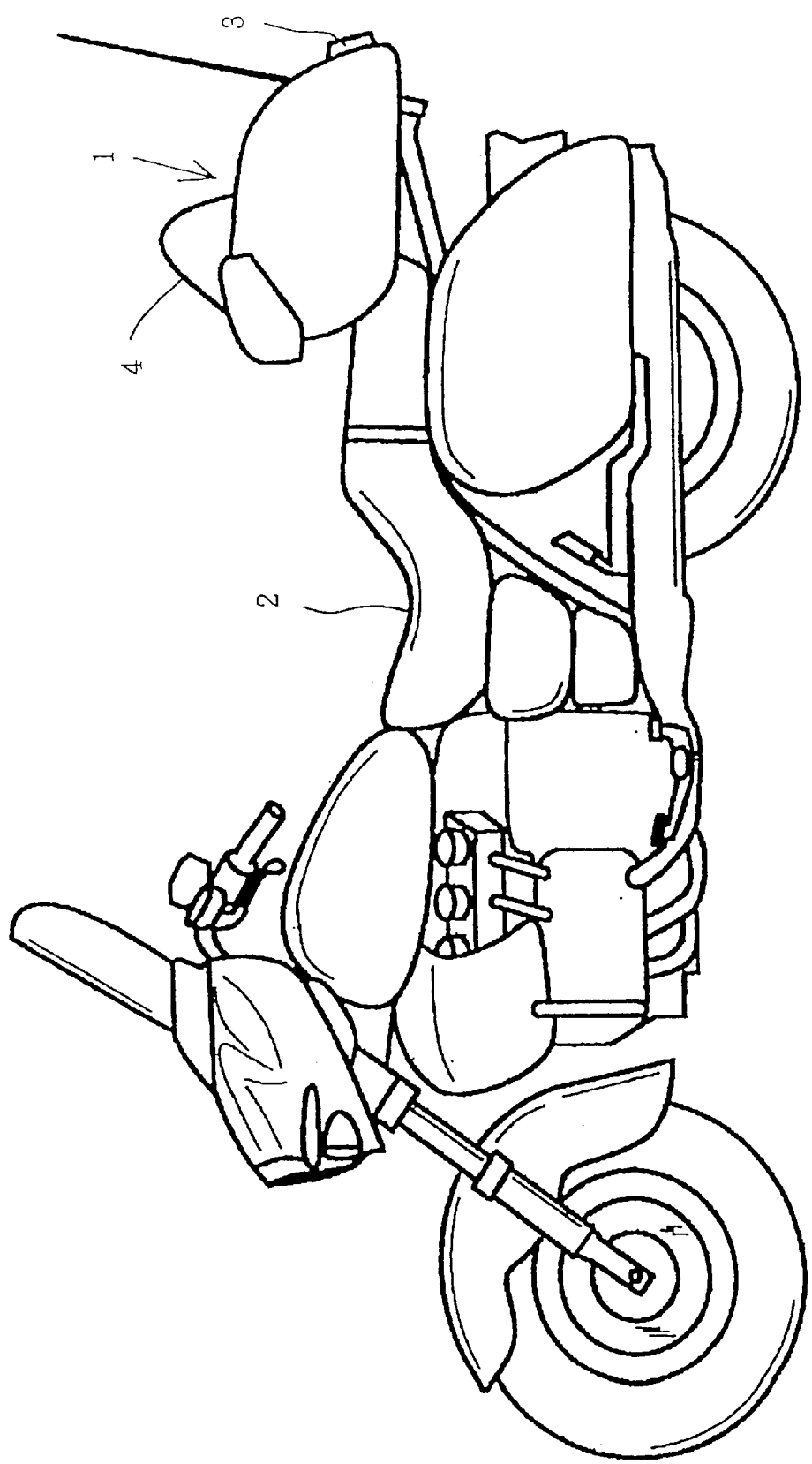
FIG. 1 is a side view of a two-wheeled motor vehicle in use.

As shown in FIG. 1, a rear trunk 1 is disposed behind a tandem seat 2 at a rear position of a two-wheeled motor vehicle. A stop lamp 3 (an electric appliance) is mounted at a lower position of the back of the rear trunk 1 such that a body portion thereof is received in the interior of the rear trunk 1. A back rest 4 is mounted on an upper front side of the rear trunk 1.

Figure 2:
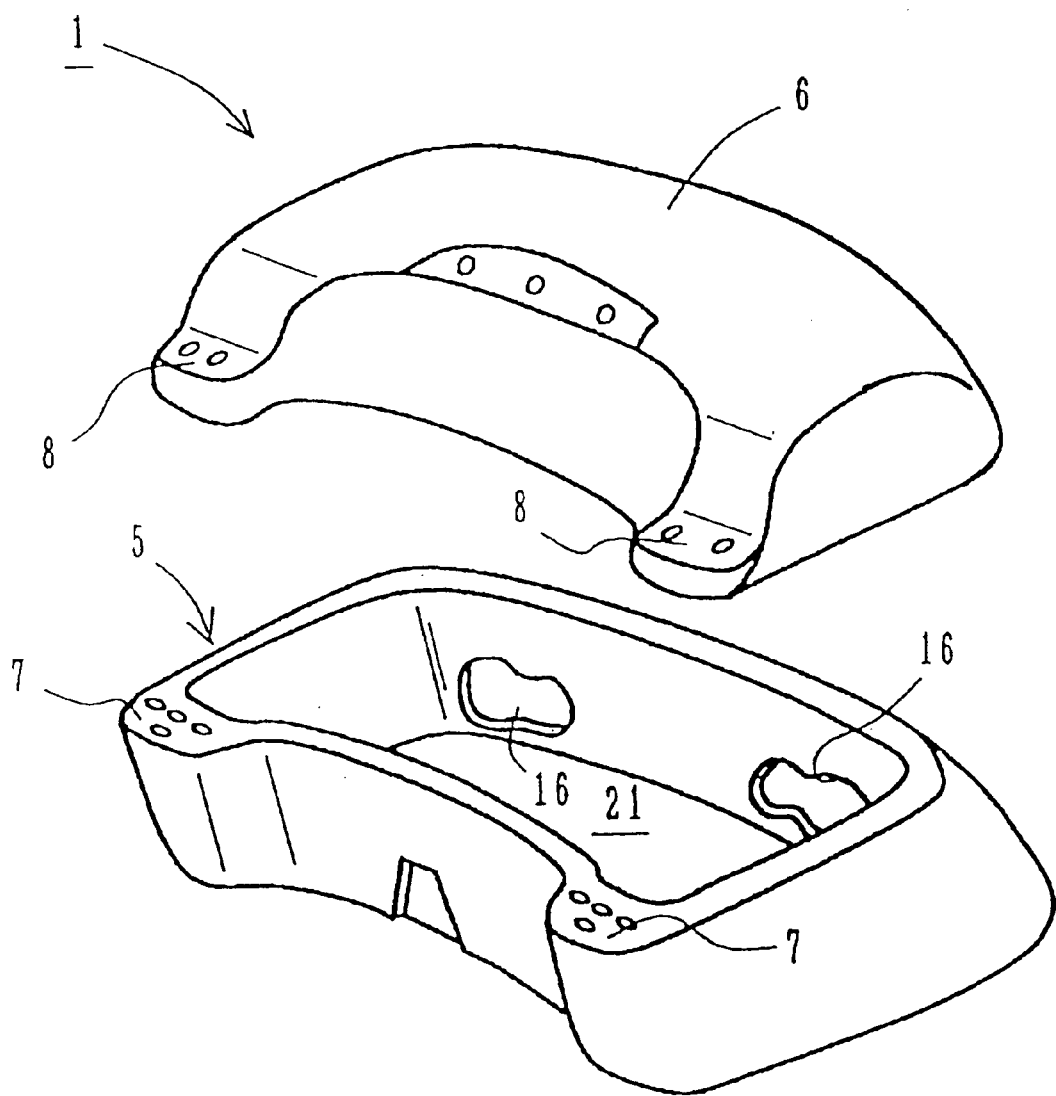
FIG. 2 is an exploded perspective view of the rear trunk.

As shown in FIG. 2, the rear trunk 1 includes a trunk body portion 5 having an opening, and a lid portion 6 for opening and closing the opening of the trunk body portion. The trunk body portion 5 and the lid portion 6 are connected together by hinges 9 (see FIG. 3) mounted to hinge mounting portions 7 and 8 which are provided on the right and left of front ends of the trunk body portion 5 and the lid portion 6, respectively.

Figure 3:
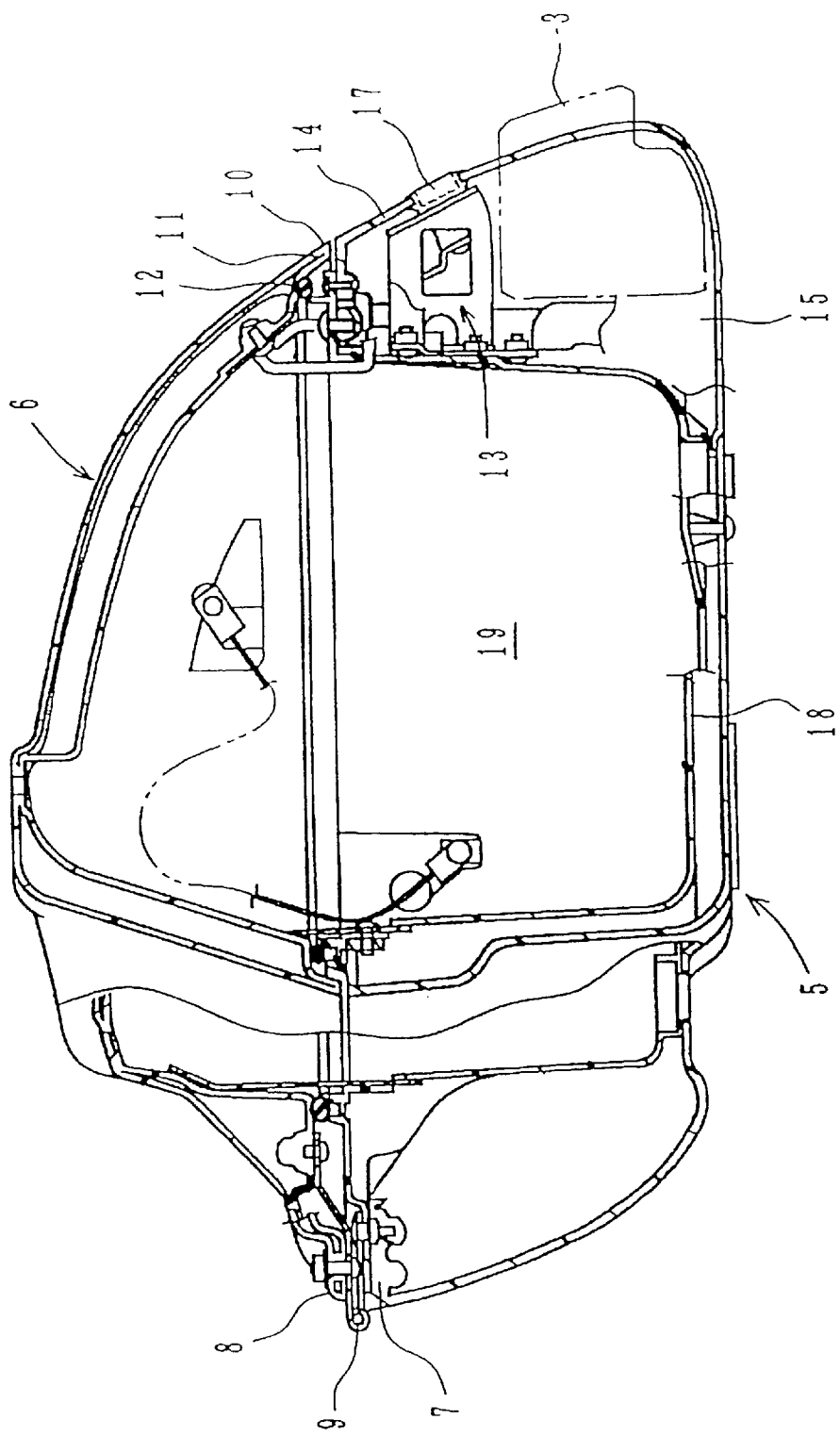
FIG. 3 is a longitudinal sectional view of a rear trunk according to the present invention.

As shown in FIG. 3, an opening edge 10 of the trunk body portion 5 is hermetically sealed to a peripheral edge 11 of the lid portion 6 by a seal 12. The lid portion 6 is locked by a locking device 13 at a rear position of the trunk body portion 5. A rear wall 14 of the trunk body portion 5 extends rearwardly on its lower side to form an inclined surface, and the rear side of the lid portion 6 is smoothly contiguous to the rear wall 14 in the form of a continuous curved surface.

An electric appliance receptacle portion 15 is formed below the rear wall 14, and a body portion of the stop lamp 3 is received in the electric appliance receptacle portion 15. A lens portion of the stop lamp 3 projects rearwardly from each of the mounting holes 16 (see also FIG. 5) formed in the rear wall 14. Numeral 17 denotes a key lock which is secured to a rear wall of an inner box 18 together with a lock mechanism portion.

The inner box 18 is in the shape of a container which opens upwardly. In the interior of the inner box 18 is formed a goods receptacle portion 19, which is separated from the electric appliance receptacle portion 15. The area of the opening of the inner box 18 and that of the bottom thereof may be roughly equal to each other. The inner box 18 may be formed, for example, by injection molding using a synthetic resin. The seal 12 is fitted in a groove which is formed in the peripheral edge of the inner box 18.

Figure 4:
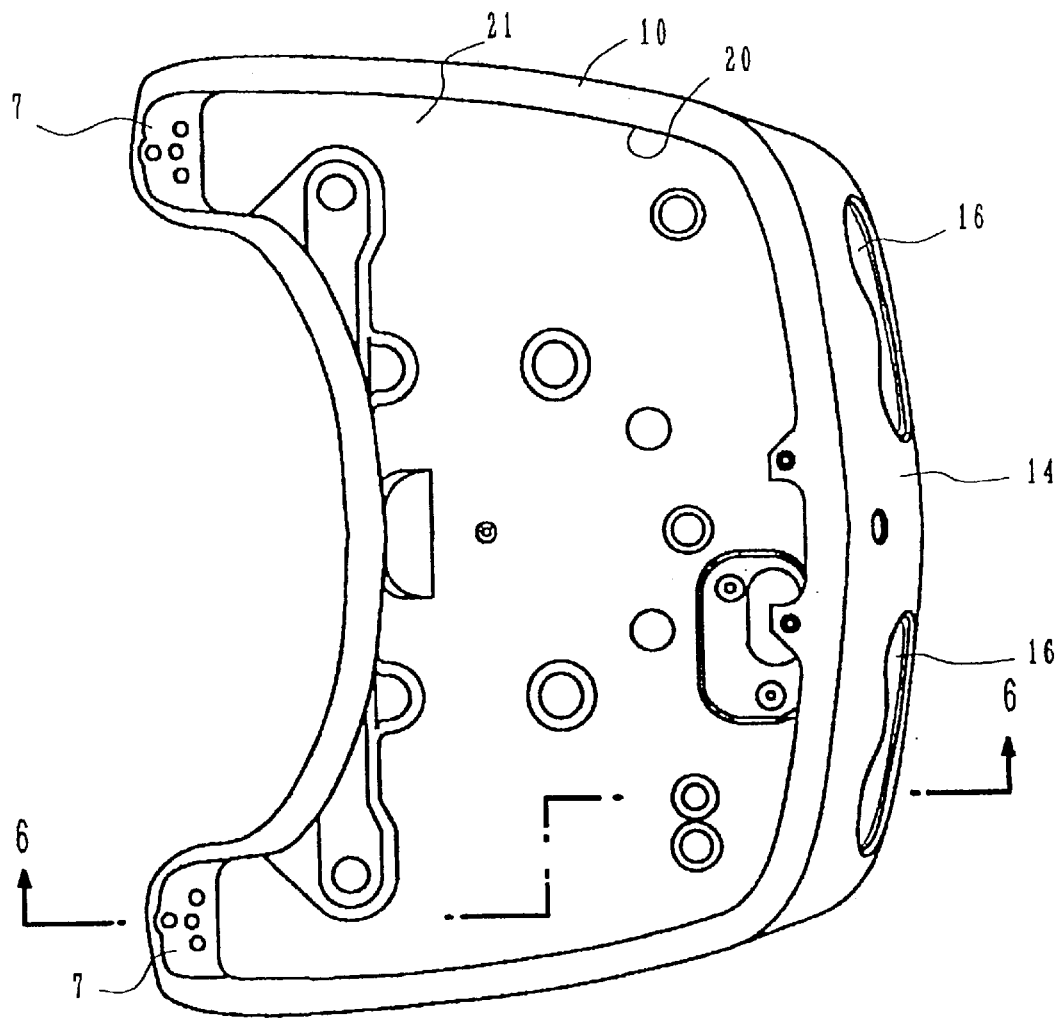
FIG. 4 is a plan view of the trunk body portion.

FIG. 4 is a plan view of the trunk body portion. In FIG. 4, the size of the relatively narrow opening can be seen in relation to the area of the bottom of the trunk body.

Figure 5:
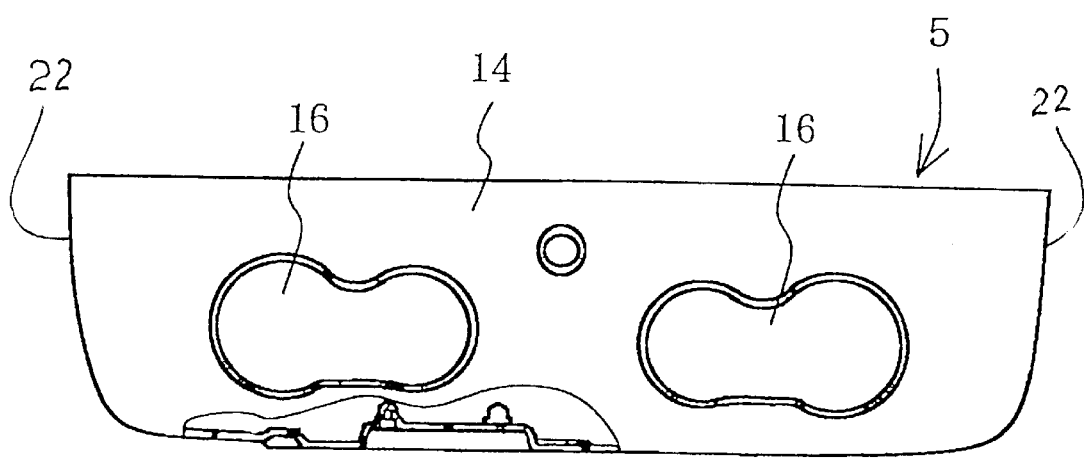
FIG. 5 is a rear view of the trunk body portion.

FIG. 5 is a rear view of a trunk body portion. Mounting holes 16 provide a surface for mounting a stop lamp 3, the body portion of the stop lamp being received in the electric appliance receptacle portion 15. Side walls 22 are curved and extend substantially along a longitudinal direction of the trunk body portion 5.

Figure 6:
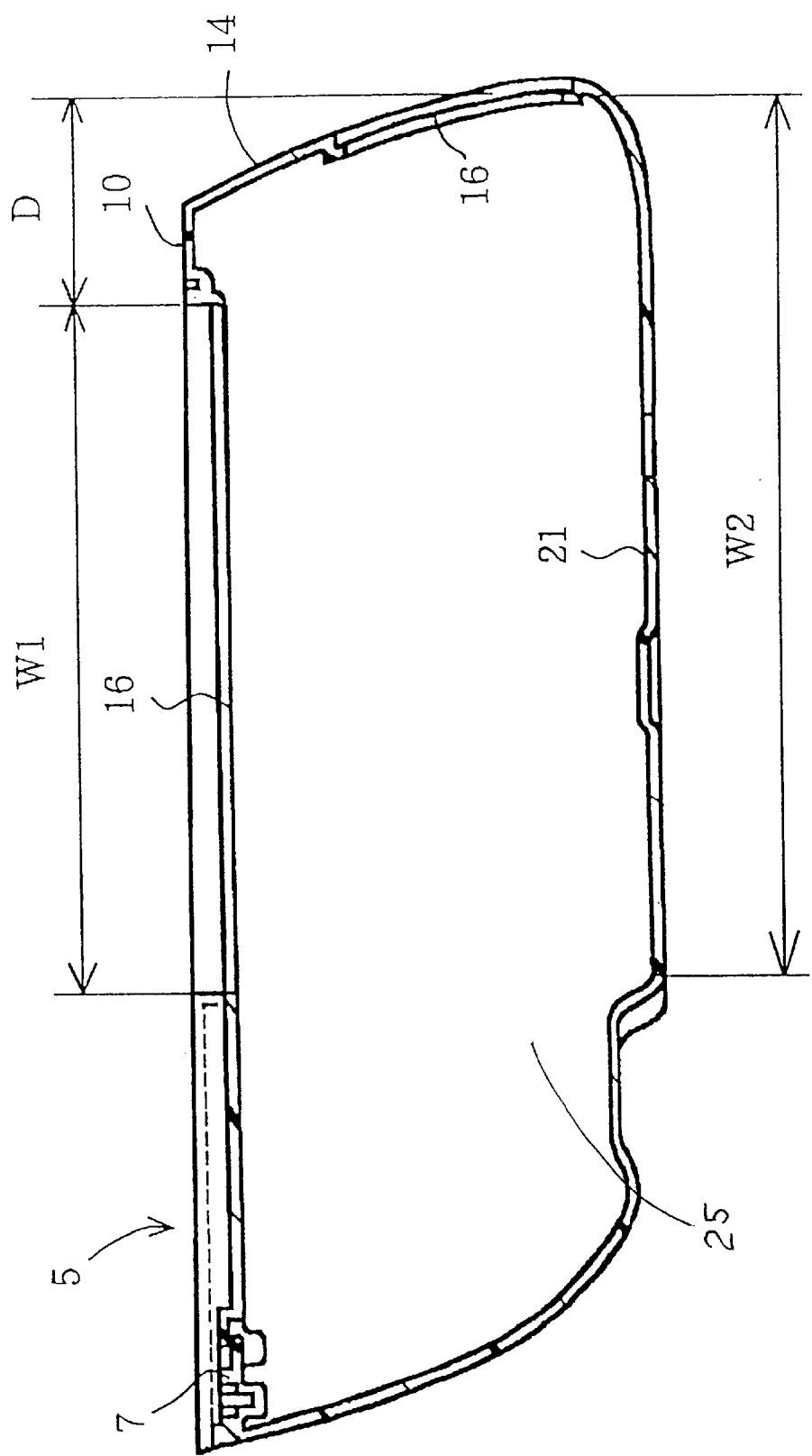
FIG. 6 is a sectional view taken along line 6—6 in FIG. 4.

The trunk body portion 5 will now be described in detail. As shown in FIG. 6, the trunk body portion 5 has a relatively narrow upper portion such that an opening width WI of an opening 20 is smaller than the width W2 of a bottom 21 (W1<W2) in the vehicular longitudinal direction. The trunk body portion forms a body space 25 which may receive the inner box 18, dividing the body space 25 into two compartments.

Further, behind the opening 20, the rear wall 14 is inclined and forms an inclined surface, which therefore assumes an overhang position indicated by the reference mark D relative to the rear end of the bottom 21.

By blow-molding a suitable thermoplastic resin such as ABS resin, the trunk body portion 5 is obtained as a single hollow molded product as a whole, with the opening 20 and mounting holes 16 not formed yet therein. After blow molding, the portions corresponding to the opening 20 and mounting holes 16 are cut from the molded product in a post-machining process. The trunk body portion 5 is therefore easily manufactured. The lid portion 6 can also be formed by blow molding so as to have a double-walled structure as shown in FIG. 3.

As shown in FIG. 3 and other figures, the trunk body portion 5 can be formed as a single body as a whole by blow molding, despite the opening 20 being narrower than the bottom 21, and despite the rear wall 14 being formed on its lower side as an inclined surface. Despite the shape of the trunk body portion, it is not necessary to adopt a right-left divided form.

Further, because the goods receptacle portion 19 and the electric appliance receptacle portion 15 are partitioned from each other by the inner box 18 (an inner member), goods in the goods receptacle portion 19 can be stored separately from the stop lamp 3. Thus, the goods and the stop lamp are less likely to be damaged.

The electric appliance is not limited to the above example of a stop lamp, but any of various other electric appliances may be employed in the present invention. The inner box 18 may not only be formed as a separate component, but also as one piece with the trunk body portion 5 by blow molding. In this case, the structure not only becomes simpler and production easier, but the trunk body portion 5 itself can be utilized as an inner box.

For partitioning the interior of the trunk body portion 5 into the goods receptacle portion 19 and the electric appliance receptacle portion 15, the inner box 18 is not always needed, but it may be omitted and substituted as a partition wall. In this case, the partition wall is optional whether the partition wall is to be integral with or separate from the trunk body portion 5. The rear trunk of the present invention is applicable not only to two-wheeled motor vehicles but also to various other vehicles.

The invention being thus described, it will be obvious that the same may be varied in many ways. Such variations are not to be regarded as a departure from the spirit and scope of the invention, and all such modifications would be obvious to one skilled in the art are intended to included within the scope of the following claims.

What is claimed is:

1. A trunk for a vehicle comprising:
   a lid;
   a body portion including:
      a bottom;
      side walls extending substantially along a longitudinal direction of the body portion;
      a rear wall extending substantially along a transverse direction of the body portion;
      a front wall, wherein edges of the walls of the body portion each form a part of an opening edge of the body portion, a longitudinal distance from the rear wall part of the opening edge to the front wall part of the opening edge being less than a longitudinal distance across the bottom of the body portion; and
      a body space provided in the body portion, the body space extending from the opening edge of the front wall to form a C-shape within which a passenger seat is locatable.

2. The trunk of claim 1, wherein the rear wall extends at an angle from the bottom of the trunk body, such that the rear wall part of the opening edge overhangs the bottom of the body portion.

3. The trunk of claim 1, further comprising an inner member, the inner member being disposed within the body portion, and dividing the body portion into at least two compartments.

4. The trunk of claim 3, wherein the inner member divides the body portion into a goods receptacle portion and an electric appliance receptacle portion.

5. The trunk of claim 3, wherein the inner member is formed integrally with the body portion.

6. The trunk of claim 5, wherein the inner member is formed by blow molding.

7. The trunk of claim 1, wherein the walls and the bottom of the body portion are integrally formed by blow molding.

8. The trunk of claim 2, wherein two mounting holes are formed in the rear wall, the mounting holes being suitable for accommodating vehicle stop lights.

9. The trunk of claim 1, further comprising mounting portions disposed along the front wall of the body portion, one mounting portion each extending from a respective wall of the body portion, the mounting portions including apertures for mounting hinges.

10. A trunk body comprising:
    a bottom;

side walls extending substantially along a longitudinal direction of the trunk body;

a rear wall extending substantially along a transverse direction of the trunk body; and a front wall, wherein the walls of the body portion form an opening edge of the body portion and further form a body space extending from the opening edge of the body portion to form a C-shape within which a passenger seat is locatable, the rear wall extending at an angle to the bottom of the trunk body such that a portion of the rear wall which forms a rear part of the opening edge of the trunk body overhangs the bottom of the trunk body, and the walls and the bottom of the trunk body are integrally formed by blow molding.

11. The trunk body of claim 10, further comprising an inner member, the inner member being disposed within the trunk body space, and dividing the body space into at least two compartments.

12. The trunk body of claim 11, wherein the inner member is integrally formed with the walls and the bottom of the trunk body by blow molding.

13. The trunk body of claim 10, wherein two mounting holes are formed in the rear wall, the mounting holes being suitable for accommodating vehicle stop lights.

14. The trunk of claim 3, wherein the inner member is formed as a separate component from the body portion.

15. The trunk of claim 5, wherein the inner member is formed as a one piece structure with the body portion.

16. The trunk of claim 1, further comprising a pair of hinges for connecting the lid to the body portion, the hinges being mounted on the body portion adjacent the C-shaped front wall with a space for a passenger seat being located between the pair of hinges.

17. The trunk body of claim 12, wherein the inner member is formed as a one piece structure with the body portion.

* * * * *